Jan. 30, 1940.  W. E. ENGLAND  2,188,342
MANUFACTURE OF VEHICLE FLOOR MATS
Filed July 29, 1936   2 Sheets-Sheet 1
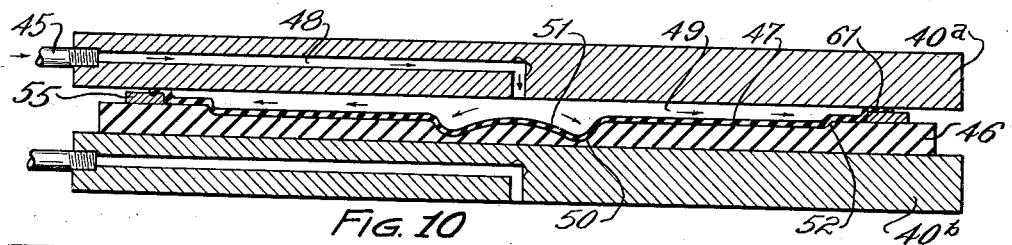
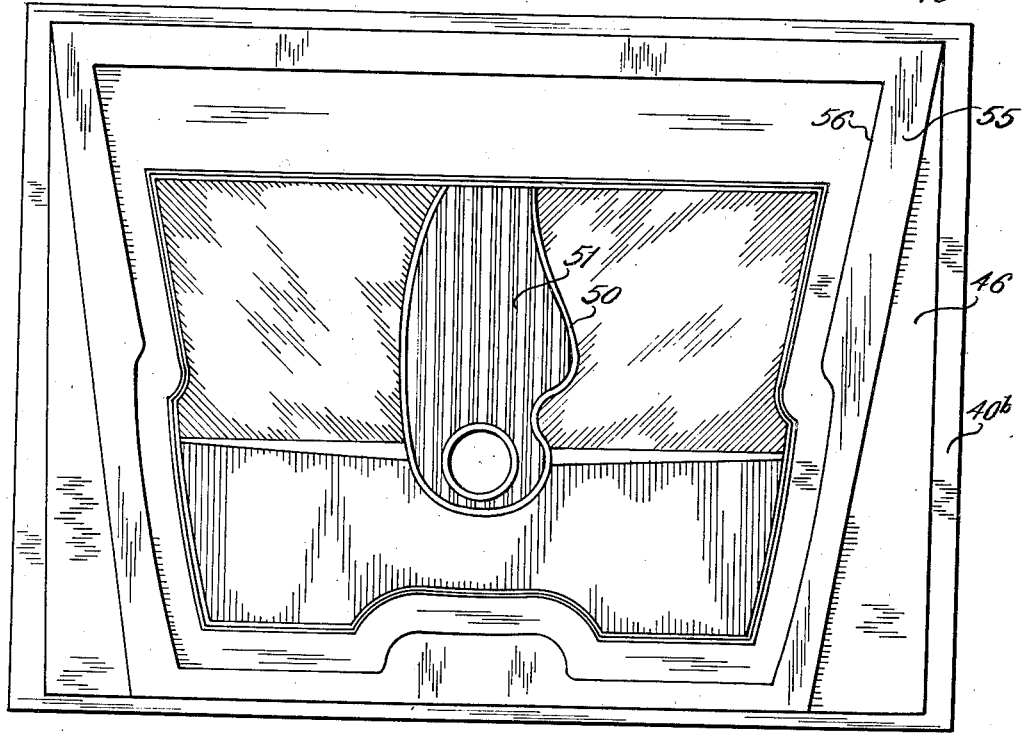
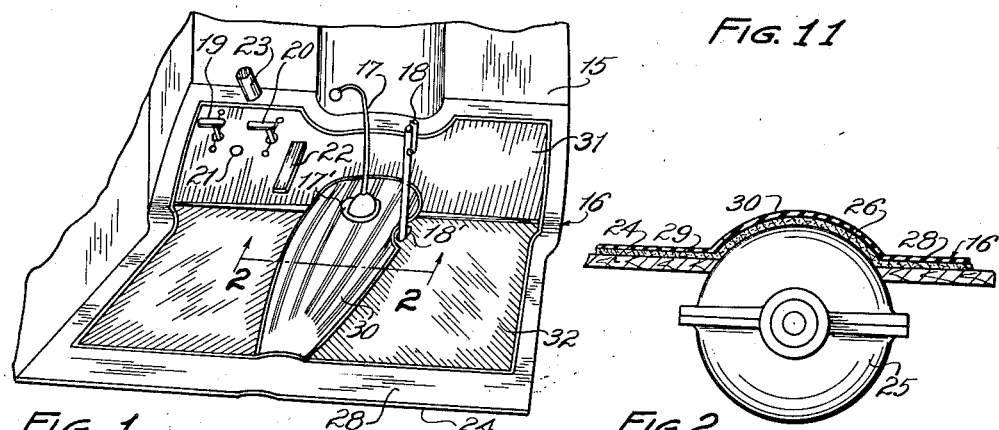
INVENTOR.
BY WILLIAM E. ENGLAND
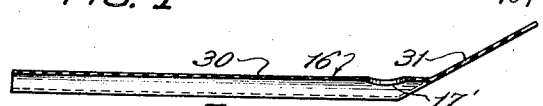
ATTORNEYS.

Jan. 30, 1940.  W. E. ENGLAND  2,188,342
MANUFACTURE OF VEHICLE FLOOR MATS
Filed July 29, 1936   2 Sheets-Sheet 2
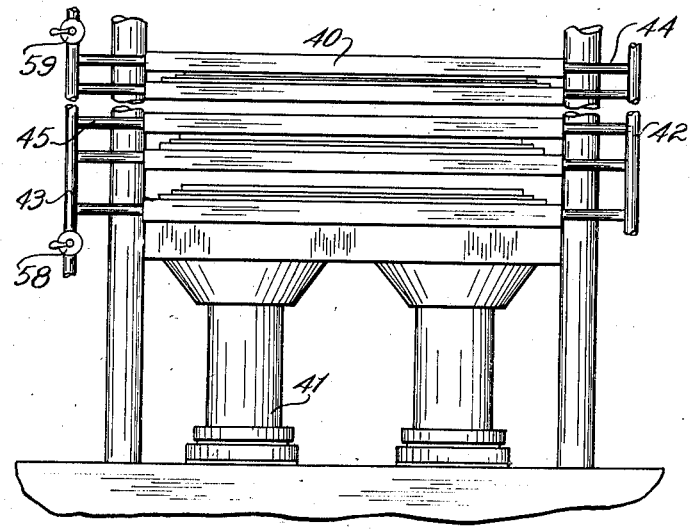
FIG. 9
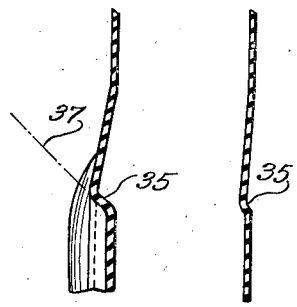
FIG. 7
FIG. 8
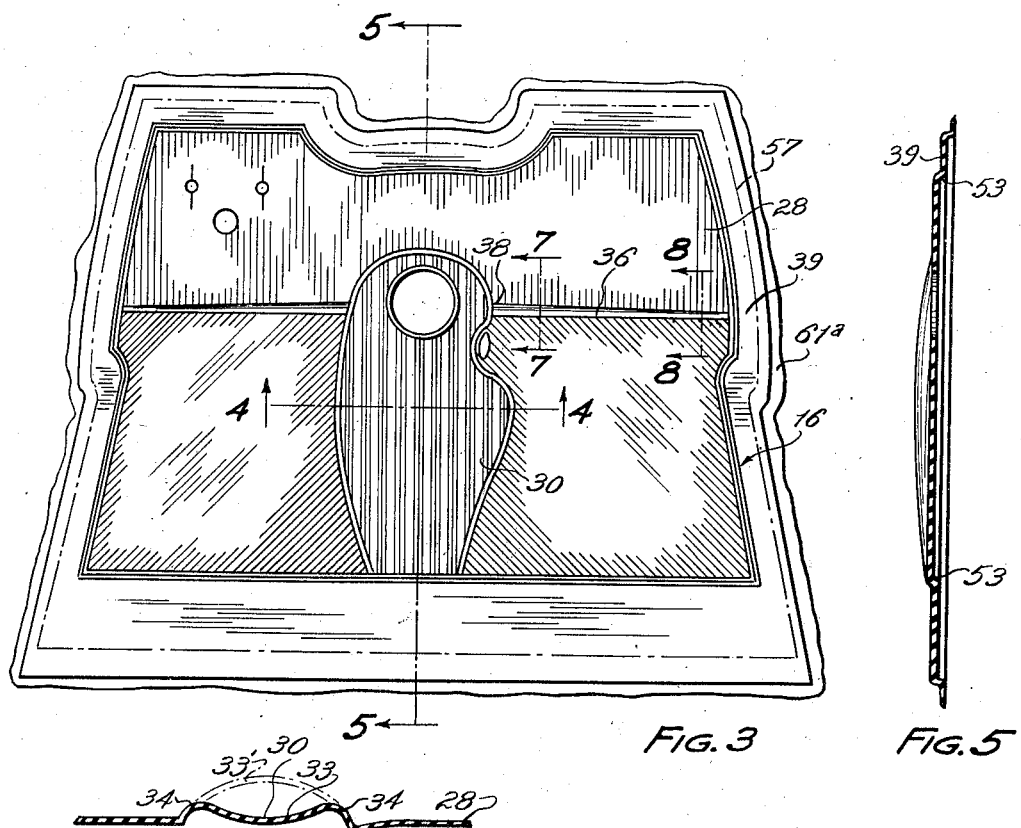
FIG. 3
FIG. 5
FIG. 4
INVENTOR.
WILLIAM E. ENGLAND
BY Kwis, Hudson & Kent
ATTORNEYS.

Patented Jan. 30, 1940

2,188,342

UNITED STATES PATENT OFFICE 2,188,342

MANUFACTURE OF VEHICLE FLOOR MATS

William E. England, Willoughby, Ohio, assignor to The Ohio Rubber Company, Willoughby, Ohio, a corporation of Ohio Application July 29, 1936, Serial No. 93,222

2 Claims. (Cl. 18—56)

This invention relates to the manufacture of vehicle floor mats, and more particularly to the manufacture of floor mats of the type known as "humped" or "contoured" mats.

In certain makes of automobiles the compartment floor has a hump-like projection caused by a transmission casing or other part of the vehicle structure extending above the floor surface. The floor mats used in the compartments of these vehicles have a humped or contoured portion which extends over and conforms to the shape of such hump-like projection of the vehicle structure. According to one method of manufacturing such humped floor mats a sheet of rubber stock is embossed and partially cured in a vulcanizing mold in a substantially flat condition, and is then transferred to another mold in which the curing is completed and in which a portion of the mat is "blown", that is, stretched by fluid pressure and formed to a hollow hump portion which will substantially fit the floor projection of the vehicle when the mat is placed in the compartment. This method of manufacturing humped or contoured floor mats has the disadvantage that the forming of the humped portion of the mat to the height which the vehicle part extends above the floor surface requires a deep or thick mold and this reduces the number of molds that can be accommodated in a vulcanizing press of a given size. The reduced number of molds to be accommodated in a given press, of course, reduces the number of mats which can be produced at a curing operation. Other disadvantages of this method have been encountered in the way of a lack of uniform stretch in the partially cured rubber resulting in irregularity in the thickness of the rubber of the humped portion; in an unsatisfactory fluid seal around the outer edge of the mat during the blowing or contouring operation; and in an excessive amount of flash being produced around the outer edge of the mat. These and other disadvantages are largely overcome by the present invention which provides a novel method of making humped floor mats, wherein the mat is cured, embossed and contoured in a single operation.

Another object of my invention is to provide a novel method of making humped or contoured floor mats, wherein a portion of the mat is molded to substantially the shape which a preformed hollow bulge of the mat, corresponding in shape with the floor projection, would normally assume when unsupported.

A further object of my invention is to provide a novel method of making humped floor mats involving the step of curing a layer of rubber stock and imparting to a portion of the layer a wavy or undulatory transverse contour affording a peripheral length substantially equal to the corresponding transverse peripheral length of the floor projection over which such mat portions are to extend.

Other objects and advantages of my invention will be apparent from the following description when taken in conjunction with the accompanying sheets of drawings, wherein Fig. 1 is a perspective view showing the humped mat of my invention in use in a vehicle compartment.

Fig. 2 is a partial transverse sectional view taken on line 2—2 of Fig. 1.

Fig. 3 is a plan view of a vehicle floor mat produced according to my invention.

Fig. 4 is a partial transverse sectional view thereof taken on line 4—4 of Fig. 3.

Fig. 5 is a longitudinal sectional view taken on line 5—5 of Fig. 3.

Fig. 6 is another longitudinal sectional view taken through the hump portion and illustrating the shape assumed thereby when the mat is on the vehicle floor.

Figs. 7 and 8 are partial longitudinal sectional views of the mat taken respectively on lines 7—7 and 8—8 of Fig. 3.

Fig. 9 is a partial front elevation of a vulcanizing press which may be used in carrying out my invention.

Fig. 10 is a sectional view taken through a pair of cooperating platens of the press and illustrating my novel method, and Fig. 11 is a plan view of a mold member used in practicing my invention.

As already indicated in a general way, my invention provides an improved vehicle floor mat of the humped or contoured type and a novel method and apparatus for producing such mats. More detailed reference will presently be made to the accompanying drawings in describing this improved mat and the novel method and apparatus for producing the same, but before proceeding with such more detailed description it should be understood that the drawings are illustrative only and that the invention may be embodied in floor mats of other forms than that shown in this instance, and that the invention may be carried out with other apparatus and steps of procedure than those herein specifically described.

As an illustration of the type of floor mat here under consideration, I have shown in Fig. 1 a motor vehicle compartment 15 to the floor of which a humped or contoured mat 16 has been fitted. The vehicle compartment illustrated in this instance is a front compartment into which various vehicle controls extend, such as the levers 17 and 18, the pedals 19 and 20, and the control members 21, 22 and 23. The floor of the compartment is formed in part by the usual horizontally extending floor boards 24 and in part by an inclined toe board extending forwardly and upwardly therefrom. The floor of the compartment is also formed in part by a portion of the vehicle structure, in this instance the transmission casing 25, extending above the level of the floor boards 24 as a hump-like projection 26.

The mat 16 is of the type comprising a wear sheet 28, of soft rubber or other suitable material, which conforms substantially to the shape or outline of the compartment, and a cushioning and insulating backing layer 29 which underlies the wear sheet and may be substantially coextensive therewith. The wear sheet and the backing layer may be provided with suitably located openings or cut-outs 17', 18', etc., through which the above mentioned various vehicle controls extend. When the mat is in place in the vehicle compartment a portion thereof extends over the floor projection 26 as a transversely curved convex hump 30. If desired the cushioning and insulating backing layer 29 may also extend over the floor projection 26 beneath the hump portion of the wear sheet. The various portions of the wear sheet of the mat may be provided with surface ornamentation, for example as shown in this instance, the portion 31 of the mat which overlies the inclined toe board may have longitudinally extending ribs embossed thereon and the portion 32 of the wear sheet which overlies the horizontal floor boards 24 may have diagonally extending ribs embossed thereon. The humped portion 30 of the wear sheet may also have longitudinally extending ribs, or other suitable design, embossed thereon.

It will be noted from Figs. 1 and 2 that when the mat is in place in the vehicle compartment the hump portion 30 of the wear sheet substantially fits and conforms to the shape of the floor projection 26 and that when the hump portion of the mat is in this distended or bulged condition its transverse contour or transverse peripheral length is substantially the same as the transverse contour or peripheral length of the floor projection. According to my invention the hump portion 30 of the mat is not preformed to the transverse contour of the floor projection 26 but is preformed to a different transverse contour which is of substantially less height than the floor projection. For the hump portion I select a shape, to be described more fully hereinafter, which will afford a transverse peripheral length or contour such that the hump portion of the mat will readily adapt itself to the transverse contour of the floor projection, without stretching or undesirable stresses when the mat is applied to the vehicle floor.

In Figs. 3, 4 and 5 I have shown the wear sheet of the front compartment floor mat 16 as it would appear upon being removed from the curing mold. At this stage the wear sheet is cured to the desired extent and has the desired rib patterns, or other surface ornamentation, embossed upon the different portions thereof as mentioned above. One very marked difference between the wear sheet at this stage and the wear sheet after it has been applied to the vehicle floor as shown in Figs. 1 and 2, resides in the shape of the hump portion 30. In carrying out my invention this hump portion of the mat is preformed to a transverse contour corresponding substantially with the transverse contour which would normally be assumed, under the action of gravity, by an unsupported hump portion preformed to substantially the transverse contour of the floor projection. In other words I preform the hump to substantially the shape of a partially collapsed hump which was originally preformed to the shape of the floor projection. During the curing and embossing of the wear sheet 28, the hump portion 30 thereof is molded to the transverse contour illustrated in Figs. 3, 4 and 5 in which the top central portion 33 sags or dips downwardly into the recess beneath the hump. The portion 32 defines a longitudinally extending transversely curved recess or concavity formed in the top of the hump with the curvature of this portion merging smoothly with the curvature of the hump portions 34 on opposite sides thereof. These oppositely curving portions 33 and 34 of the wear sheet impart to the hump of the mat a wavy or undulatory transverse contour as shown in Figs. 4 and 5. By imparting such a wavy shape to the hump portion of the mat during the molding operation I find that I can obtain the necessary transverse peripheral length to enable the hump portion to extend over and conform to the shape of the floor projection 26. I also find that when a wear sheet having the hump portion thereof molded to the transverse contour shown in Figs. 3, 4 and 5 is applied to the compartment floor, the concave portion 33 will be readily distended by the floor projection and the hump portion of the mat will assume the shape of one large hollow bulge, as indicated by the broken lines 33' of Fig. 4, with stretching of the sheet or the creation of undesirable stresses therein.

As indicated in the drawings the wear sheet is cured in a generally flat condition, except for the hump portion 33, and when the mat is applied to the compartment floor the concave portion of the hump is distended to convex form and the forward portion 31 of the mat assumes an upwardly inclined position corresponding with the inclination of the toe board. Since the wear sheet is molded in this generally flat condition and the forward portion 31 thereof is required to be bent upwardly to fit the inclination of the toe board, I find it desirable to provide the sheet with molded shoulder portions 35 which extend laterally from the hump portion at approximately the location of the transverse junction line 36 between the horizontal and inclined floor boards. The shoulder portions 35 are preferably molded to substantially the angle of inclination of the toe board, as indicated by the line 37 of Fig. 7, so that when the mat is applied to the vehicle floor the angular areas or sections 38 immediately adjacent to the hump portion will be able to lie flat against the floor boards even though the forward end of the preformed hump portion 30 extends beyond the junction line 36 and part way into the toe board portion of the mat. The preformed shoulders 35 are of maximum height immediately adjacent the hump portion and are of progressively decreasing height outwardly from the hump portion, and preferably disappear or merge into the flat portion of the wear sheet just inwardly of the border section 39. I find it desirable to terminate these preformed shoulders inwardly of the border because it would otherwise be difficult to maintain a proper fluid seal around the edges of the mat during the molding and vulcanizing operation.

In Figs. 9, 10 and 11 I have shown molding apparatus which may be used in carrying out my invention, although it should be understood that various other molding apparatus could be employed. The apparatus shown in Fig. 9 is a vulcanizing press of the type having a plurality of pairs of platens 40 between which the mold members and the raw stock are received, and hydraulically operated plungers 41 for actuating the platens and applying the desired vulcanizing pressure to the stock. The vulcanizing press may have manifolds 42 and 43 adjacent thereto for supplying the steam which is needed during the curing and molding operation. The manifold 42 has pipe connections 44 for supplying heating steam to the passages or recesses of the platens and the manifold 43 has pipe connections 45 for supplying steam pressure to the mold cavities for accomplishing the blowing and embossing of the mat.

In Fig. 10 of the drawings I have shown a pair of upper and lower platens 40a and 40b of the vulcanizing press with a production mold 46 therebetween. The platens 40a and 40b are shown in their closed position with a sheet of rubber stock 47 being pressed against a face of the mold 46 by steam pressure supplied through the pipe connection 45 and a passage 48 of the upper platen. The mold member 46 may be formed of hard rubber or any other suitable material and may have surface portions thereof provided with the desired ribbing or ornamentation which is to be embossed on the corresponding portions of the wear sheet during the curing operation. This mold member is relatively thicker around its margin so as to provide a shallow mold cavity or steam space 49 between the mold member and the upper platen 40a.

An important part of the mold member is the recess 50 therein into which a portion of the wear sheet is blown or distended by the steam pressure to form the hump portion 30 of the mat. According to my invention I form the recess 50 of the mold member as a longitudinally extending transversely curved recess having a projection 51 extending part way thereinto. The projection 51 is formed by a portion of the mold member itself but is of opposite or convex curvature. The walls of the recess 50 at opposite sides of the projection 51 are curved and merge smoothly with the curvature of this projection.

Around the inner edge of the thickened marginal portion of the mold member 46 I provide a shoulder 52 which forms a corresponding shoulder 53 on the underside of the wear sheet during the curing operation. This shoulder extends around and connects the ribbed or patterned areas of the mat with the marginal or border portion 39 thereof. If desired, the cushioning and insulating backing layer 29 may be applied to the underside of the wear sheet with its outer edge terminating just inwardly of the marginal shoulder 53, thus better enabling the border portion 39 to lie close to the floor boards.

Adjacent the outer edge of the mold member 46 I provide a mask-like part 55 which may be an integral raised part of this member or may be a separate frame member formed of metal or any other suitable material. As shown in Fig. 11 the part 55 may be constructed with the inner edge 56 thereof conforming substantially to the shape or outline desired for the finished mat but defining an outline somewhat larger than the outline to which the mat is to be trimmed, as indicated by the broken line 57 of Fig. 3. The part 55 increases the thickness of the mold member 6 around its outer edge for the purpose explained above, and also accomplishes the important functions of laterally confining the rubber stock and forming a steam-tight seal in one plane around the outer edge of the sheet during the curing and molding operation.

In carrying out my novel method a sheet 47, having the general shape of the mat to be produced, is cut from stock which has been previously calendered to the desired thickness and is laid over the mold member 46 with the edges of the sheet overlapping the part 55. The platens 40a and 40b of the press are then closed so that the upper platen compresses the overlapping edge of the sheet of stock against the part 55 and forms a fluid-tight seal at this point. After the platens have been closed, the drain valve 58 of the steam manifold 43 is closed and the supply valve 59 is opened to cause steam to be supplied to the mold cavity 49. The steam which is supplied to the mold cavity forces the sheet of rubber stock 47 against the face of the mold member 46 and into the hump forming recess 50. The pressure of the steam should be high enough to "blow" or distend the stock into the hump forming recess and to cause the design, appearing on the surface portions of the mold member, to be embossed on the face of the rubber sheet 47. Any degree of steam pressure necessary for this purpose may be used, for example, a steam pressure of sixty to one hundred pounds or more may be used. I find that during the curing operation the lateral thrust of the steam confined in the mold cavity 49 is taken against the inner edge of the part 55 and that it is only necessary to have a very narrow margin 61 of the sheet of stock clamped between the platen 40a and the frame member. This narrow marginal edge of the stock being so clamped forms a gasket around the outer edge of the mold cavity which effectively prevents the escape of steam therefrom. When the wear sheet is removed from the mold cavity the marginal portion 61 appears as a narrow strip of flash 61a around the outer edge of the sheet which, together with the shoulder 62 formed by the inner edge of the part 55, are trimmed off when the sheet is cut to the shape and size required to fit the vehicle compartment.

From the foregoing description and the accompanying drawings it will now be readily seen that I have provided a novel method for the production of vehicle floor mats, of the humped or contoured type, having a preformed hump portion of wavy or concave form which is adapted to be distended to convex form by the floor projection when the mat is placed in the vehicle compartment. It will also be seen that in my method this preformed hump portion of the mat is of relatively low height in comparison to the height of the floor projection over which it is to extend, and that this feature permits a larger number of mats to be produced during a single cure or heat of a vulcanizing press of a given size. It will be understood further that in forming such humped or contoured mats in a generally flat condition during the curing and vulcanizing operation, a more effective steam seal can be obtained around the outer edge of the mat permitting the use of higher steam pressures and the accomplishment of the blowing, curing and embossing of the wear sheet in a single operation and with a minimum amount of rubber stock being wasted in the form of flash around the outer edge of the mat and in a minimum time due to the higher temperature.

While I have illustrated and described the floor mat of my invention, and the method for producing the same, in a somewhat detailed manner, it will be understood, of course, that I do not wish to be limited to the precise details and steps of procedure disclosed, but regard my invention as including such changes and modifications as do not constitute a departure from the spirit of the invention and the scope of the appended claims.

Having thus described my invention, I claim:

1. The method of producing vehicle floor mats of the type having a hump portion adapted to overlie and conform to a projection on the vehicle floor, comprising placing a sheet of rubber stock in a mold having therein a hump-forming portion of undulating configuration and of less height than the hump portion of the mat will assume when placed on the vehicle floor and the undulations of the hump-forming portion being such as to provide sufficient material in the hump portion of the mat to permit it to be distended to the height of the floor projection without stretching of the material of the mat, molding the sheet and thereby forming thereon a distendable hump portion corresponding to the size and shape of the hump-forming portion in the mold, and curing the entire sheet while in the mold.

2. The method of producing vehicle floor mats of the type having a hump portion adapted to overlie and conform to a projection on the vehicle floor, comprising placing a sheet of rubber stock in a mold having therein a cavity adapted to contain fluid pressure and a hump-forming portion, the hump-forming portion of the mold being of less height than the hump portion of the mat will assume when placed on the vehicle floor and having an undulating transverse peripheral configuration such as to provide sufficient material in the hump portion of the mat to permit it to be distended to the height of the floor projection without stretching of the material of the mat, molding the sheet to provide a design thereon and in the same operation blowing a portion of the sheet against said hump-forming portion by fluid pressure and thereby forming thereon a distendable hump portion corresponding to the size and shape of the hump-forming portion in the mold, and curing the entire sheet while in the mold.

WILLIAM E. ENGLAND.